United States Patent
Yang et al.

(10) Patent No.: US 7,508,311 B2
(45) Date of Patent: Mar. 24, 2009

(54) RADWASTE WAREHOUSE AREA MONITORING SYSTEM

(75) Inventors: Shou-Ju Yang, Taoyuan County (TW); Shang-Lee Chyou, Taipei (TW); Ming-Huei Chen, Taoyuan County (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 367 days.

(21) Appl. No.: 11/519,887

(22) Filed: Sep. 13, 2006

(65) Prior Publication Data

US 2009/0033506 A1    Feb. 5, 2009

(51) Int. Cl.
*G08B 17/12*    (2006.01)
(52) U.S. Cl. ................ 340/600; 340/525; 340/506; 700/17; 700/83
(58) Field of Classification Search ................ 340/600, 340/525, 539.29, 506; 700/17, 83; 702/8, 702/187
See application file for complete search history.

(56) References Cited

U.S. PATENT DOCUMENTS

| | | | | |
|---|---|---|---|---|
| 4,784,802 A * | 11/1988 | Mallory et al. | ............ | 376/272 |
| 4,957,690 A * | 9/1990 | Fennern | ............ | 700/83 |
| 5,247,433 A * | 9/1993 | Kitaura et al. | ............ | 700/83 |
| 5,271,045 A * | 12/1993 | Scarola et al. | ............ | 340/525 |
| 5,287,390 A * | 2/1994 | Scarola et al. | ............ | 340/506 |
| 5,353,316 A * | 10/1994 | Scarola et al. | ............ | 700/83 |
| 5,400,246 A * | 3/1995 | Wilson et al. | ............ | 700/17 |
| 6,021,269 A * | 2/2000 | Lewis | ............ | 703/5 |
| 6,492,901 B1 * | 12/2002 | Ridolfo | ............ | 340/506 |
| 6,985,779 B2 * | 1/2006 | Hsiung et al. | ............ | 700/17 |
| 7,333,024 B2 * | 2/2008 | Nickolaou et al. | ............ | 340/506 |
| 2005/0253703 A1 * | 11/2005 | He et al. | ............ | 340/539.13 |
| 2006/0054013 A1 * | 3/2006 | Rodney et al. | ............ | 89/36.02 |
| 2006/0186342 A1 * | 8/2006 | Burger et al. | ............ | 250/370.01 |
| 2007/0205891 A1 * | 9/2007 | Spencer et al. | ............ | 340/600 |
| 2007/0241261 A1 * | 10/2007 | Wendt | ............ | 250/221 |

* cited by examiner

*Primary Examiner*—John A Tweel, Jr.
(74) *Attorney, Agent, or Firm*—Troxell Law Office PLLC

(57) ABSTRACT

A monitoring system watches out at radiation dosage in areas of a radwaste warehouse remotely. The system uses a monitoring device to coordinate with the system. By using the system, the monitoring is safe and more than one area can be monitored at the same time.

8 Claims, 5 Drawing Sheets

RADWASTE WAREHOUSE AREA MONITORING SYSTEM

FIELD OF THE INVENTION

The present invention relates to a monitoring system; more particularly, it relates to remotely monitoring a radiation dosage of a radiation area in a radwaste storage area for safe operation and multi-location monitoring.

DESCRIPTION OF THE RELATED ART

A prior art of a radiation monitoring system, as shown in FIG. 5, comprises a control unit 9 and a plurality of radiation monitors 91 connected with the control unit 9 through a local area network 92, where an operator safely monitors radiation areas one by one through the radiation monitors 91 with the control unit 9.

Although the prior art safely monitors the radiation areas, radiation areas are monitored one by one through the radiation monitor 91 with the control unit 9 and the information of the radiation area are not integrated; and the status of a radiation area is not sent to the control unit 9 in the mean time. Hence, the prior art does not fulfill users' requests on actual use.

SUMMARY OF THE INVENTION

The present invention is to remotely monitor a radiation dosage of a radiation area in a radwaste storage area for safe operation and multi-location monitoring.

To achieve the above purpose, the present invention is a radwaste warehouse area monitoring system, comprising a monitoring mechanism having a control unit, a display unit, a database unit and a plurality of monitoring devices; an alarm unit connected with the monitoring mechanism to send an alarm to the monitoring mechanism when a measured radiation value of a radiation area is greater than a default monitoring value; a radiation area switching menu connected with the monitoring mechanism to switch to a monitored radiation area by the monitoring mechanism; a historical data unit connected with the monitoring mechanism to query historical data of a radiation area by the monitoring mechanism; a system maintenance unit connected with the monitoring mechanism to process a system maintenance by the monitoring mechanism; and a monitor information unit connected with the monitoring mechanism to query information of the monitoring device in the radiation area. Accordingly, a novel radwaste warehouse area monitoring system is obtained.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is the structural view showing the first preferred embodiment according to the present invention;

DESCRIPTIONS OF THE PREFERRED EMBODIMENTS

The following descriptions of the preferred embodiments are provided to understand the features and the structures of the present invention.

Figure 1:
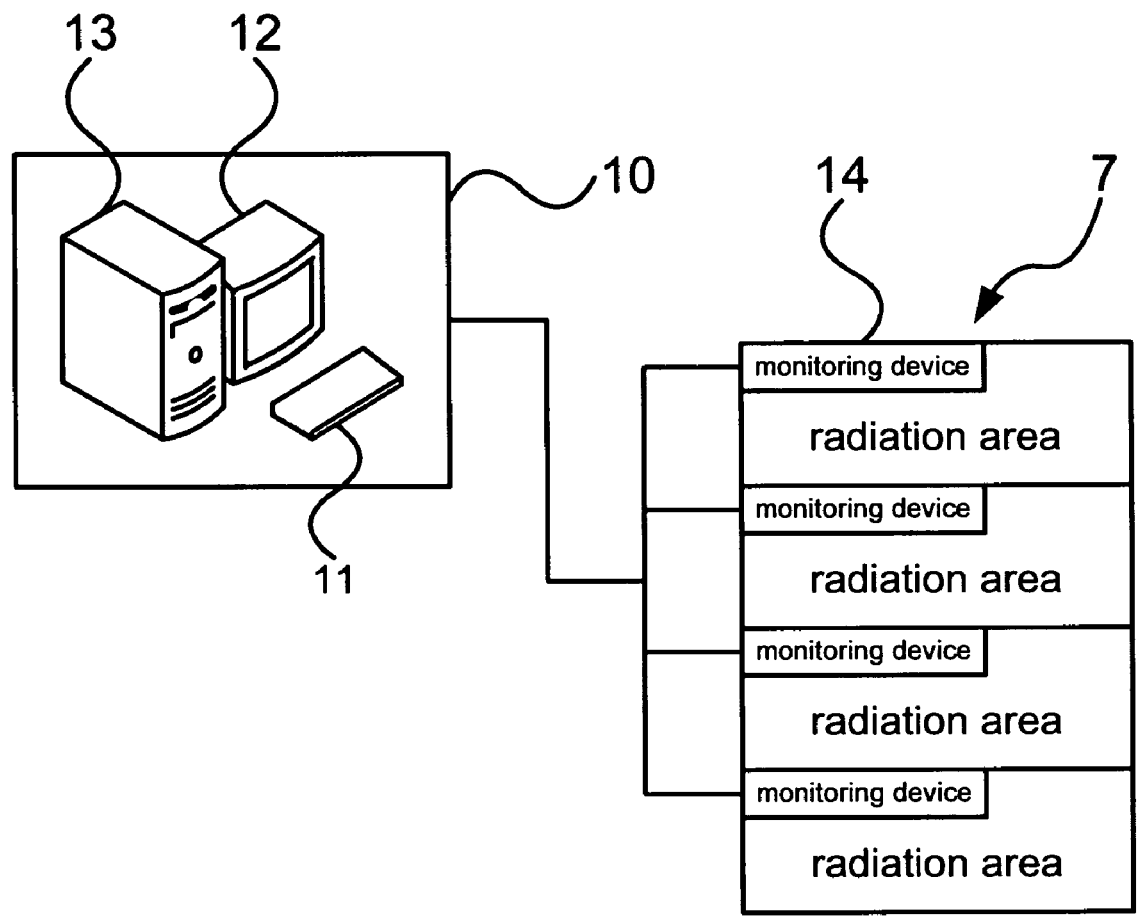
Figure 2:
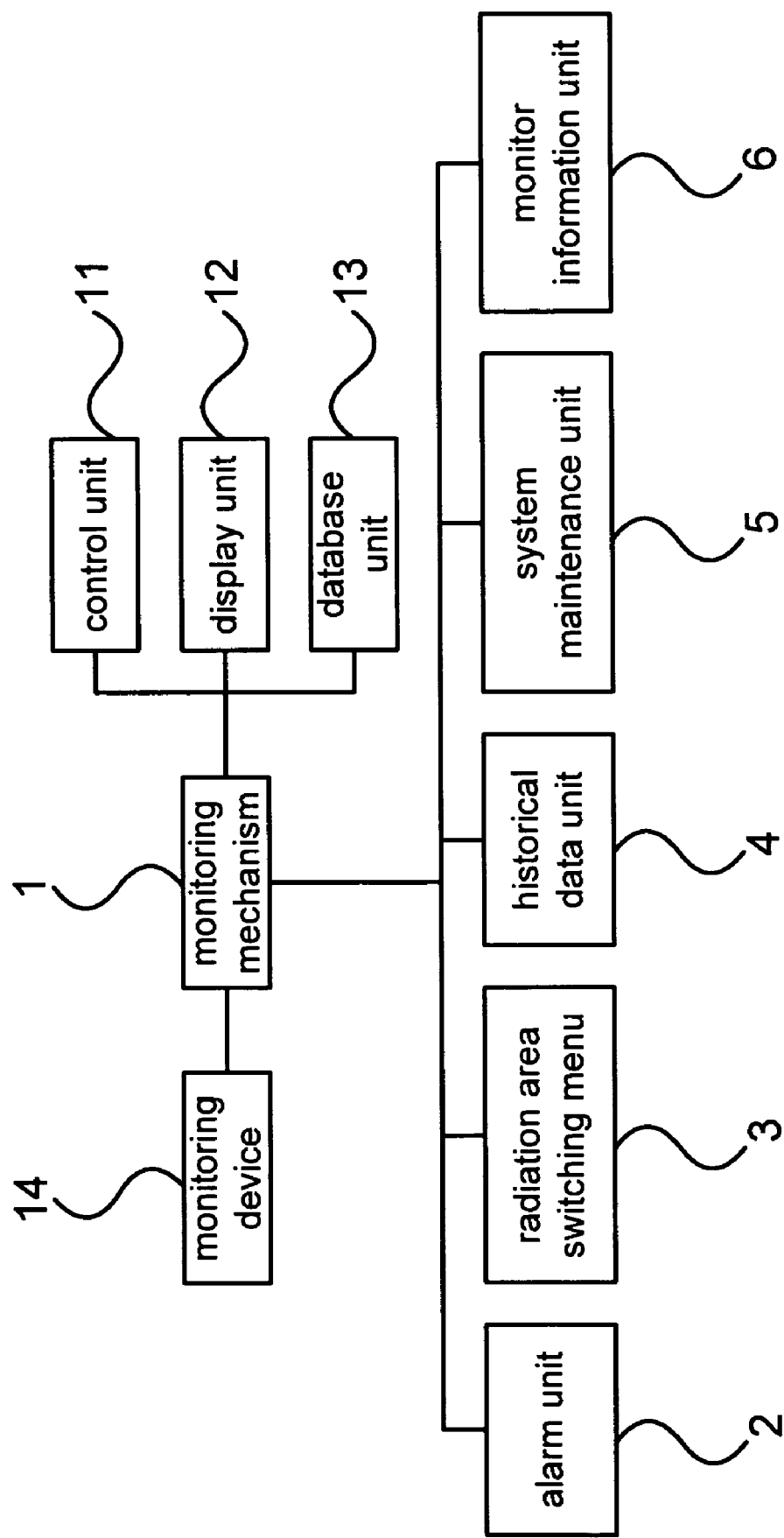
FIG. 2 is the block view of the first preferred embodiment.

Please refer to FIG. 1 and FIG. 2, which are a structural view and a block view showing a first preferred embodiment according to the present invention. As shown in the figures, the present invention is a radwaste warehouse area monitoring system, comprising a monitoring mechanism 1, an alarm unit 2, a radiation area switching menu 3, a historical data unit 4, a system maintenance unit 5 and a monitor information unit 6, where a radiation dosage of a radiation area in a radwaste storage area is monitored remotely for safe operation and multi-location monitoring.

The monitoring mechanism 1 has a control center 10 comprising a control unit 11, a display unit 12 and a database unit 13, where the database unit 13 stores and transfers monitored data of a radiation are a 7; and the monitoring mechanism 1 is connected with a plurality of monitoring devices 14 set in a plurality of radiation areas 7 separately.

The alarm unit 2 is connected with the monitoring mechanism 1. When a measured radiation value of a radiation area is greater than a default monitoring value, an alarm is sent to the monitoring mechanism 1 from the alarm unit to be displayed on the display unit 12. The alarm unit 2 periodically processes an alarm check automatically. When an alarm matter occurs, alarm data is displayed with a flush light and a voice and the alarm data is stored in the database unit 13.

The radiation area switching menu 3 is connected with the monitoring mechanism 1 for switching to a desired radiation area by the control unit 11 of the monitoring mechanism 1 for monitoring.

The historical data unit 4 is connected with the monitoring mechanism 1 for querying historical data of a radiation area 7 by the control unit 11 of the monitoring mechanism 1.

The system maintenance unit 5 is connected with the monitoring mechanism 1 for processing desired system maintenance by the control unit 11 of the monitoring mechanism 1.

The monitor information unit 6 is connected with the monitoring mechanism 1 for querying information of a monitoring device 14 by the control unit 11 of the monitoring mechanism 1.

Thus, a novel radwaste warehouse area monitoring system is obtained.

Figure 3:
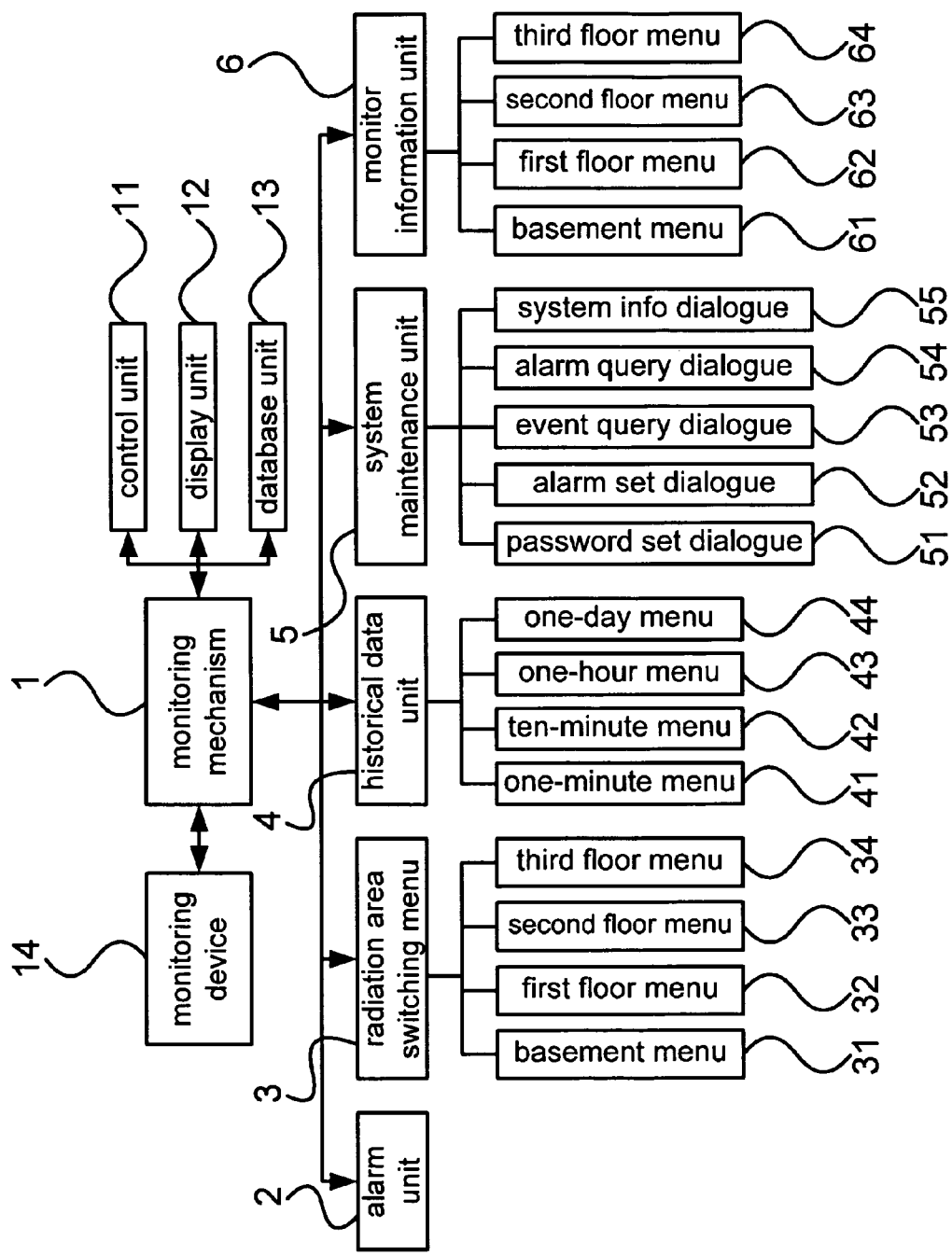
FIG. 3 is the state-of-use view of the first preferred embodiment.

Please refer to FIG. 3, which is a state-of-use view of the first preferred embodiment. As shown in the figure, when using the first preferred embodiment, an operator uses a control unit 11 of a monitoring mechanism 1 through a local area network to process a menu of an alarm unit 2, a radiation area switching menu 3, a historical data unit 4, a system maintenance unit 5 and a monitor information unit 6, where a radiation dosage and related information of each radiation area 7 in a radwaste storage area are monitored.

When the operator processes the alarm unit 2, a display unit 12 of the monitoring mechanism 1 shows a main screen of the alarm unit 2. The operator obtains an alarm upper bound from a database unit 13 to check whether the radiation dosage exceeds the alarm upper bound. If not, the monitoring continues. If yes, a flush light shines and a voice sounds for alarming; and data of a radiation value, an accident date and an on-duty operator is stored in the database unit 13.

When the operator processes the radiation area switching menu 3, the display unit 12 of the monitoring mechanism 1 shows a main screen of the radiation area switching menu 3, comprising a menu of a basement menu 31, a first floor menu 32, a second floor menu 33 and a third floor menu 34, where the operator selects to switch to a specified radiation area 7. At the same time, information of the radiation area 7 the operator selects are shown on the display unit 12 coordinated with the monitoring device 14.

When the operator processes the historical data unit 4, the display unit 12 of the monitoring mechanism 1 shows a menu of a one-minute menu 41, a ten-minute menu 42, a one-hour menu 43 and a one-day menu 44. The one-minute menu 41 is to query data per minutes for the past ten minutes; the ten minute menu 42 is to query data per ten minutes for a day selected; the one-hour menu 43 is to query data per hour for a day selected; and the one-day menu 44 is to query data per day for a month selected. After the operator obtains the historical data on the display unit 12 after selecting an item from the menu, the data is stored in the database unit 13 for later reference or printing.

When the operator processes the system maintenance unit 5, the display unit 12 of the monitoring mechanism 1 shows a menu of a password set dialogue 51, an alarm set dialogue 52, an event query dialogue 53, an alarm query dialogue 54 and a system information dialogue 55. Therein, in the password set dialogue 51, user passwords are added, deleted and updated and user levels are set to secure the system; in the alarm set dialogue 52, alarm set processes alarms when radiation dosage exceeds a default value; in the event query dialogue 53, alarm events at a specified time are queried and/or printed; and, in the system information dialogue 55, a version number and a registration description are shown.

When the operator processes the monitor information unit 6, the display unit 12 of the monitoring mechanism 1 shows a main screen of the monitor information unit 6 which is a menu for each monitoring device 14 in each radiation area 7, comprising a basement menu 61, a first floor menu 62, a second floor menu 63 and a third floor menu 64, where the monitoring device 14 is selected to query, to delete and to update data of the monitoring device 14, including a series number, a location, a device type, a radiation dosage unit (uCi/cc, Bg/m$^3$ or uSv/hr), transfer parameters (regulation parameters, background values and sensitivity parameters) and alarming positions.

Thus, a radiation dosage of a radiation area in a radwaste storage area is monitored remotely for safe operation and multi-location monitoring.

Figure 4:
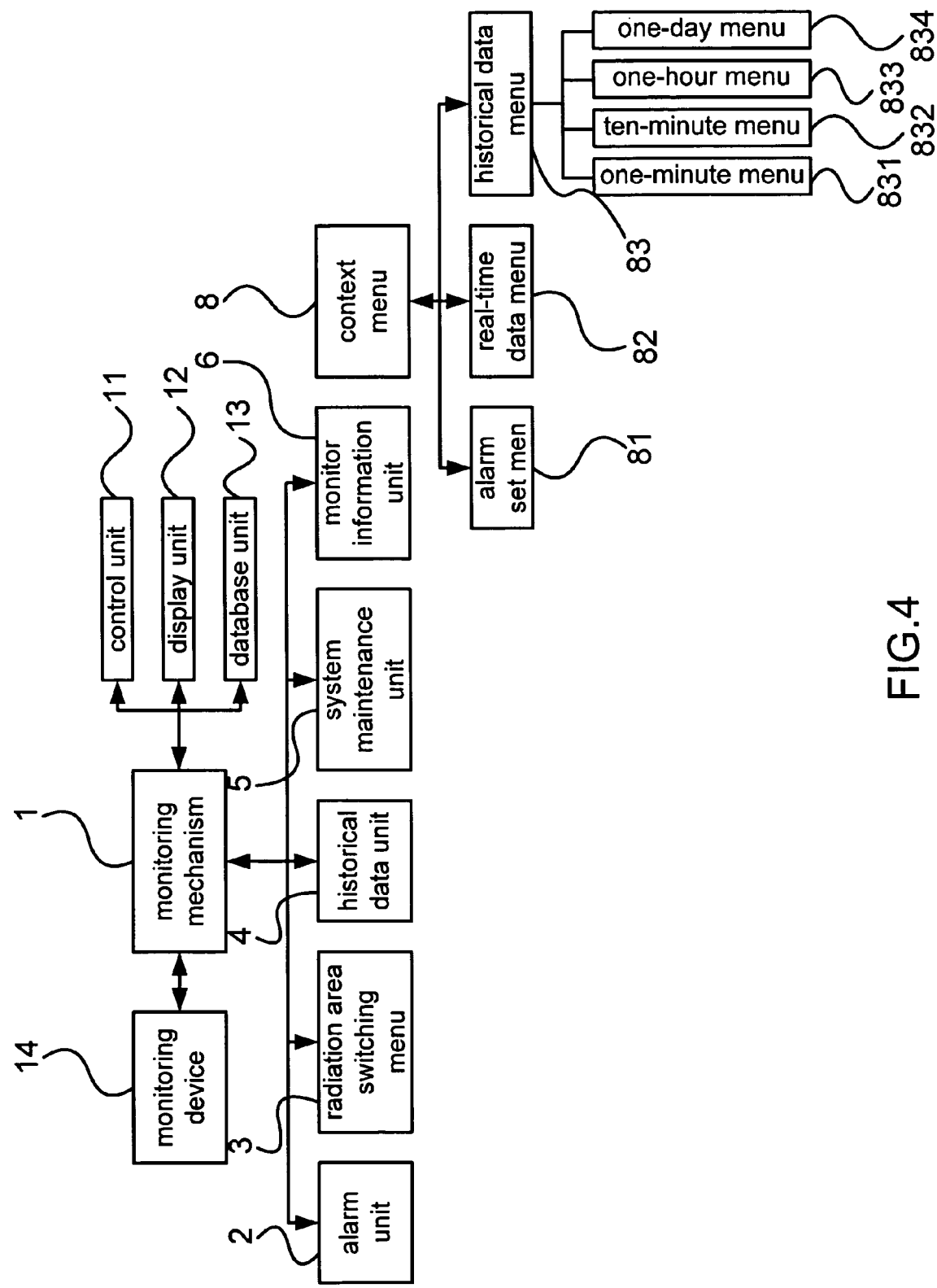
FIG. 4 is the view showing the state of use of the second preferred embodiment.
Figure 5:
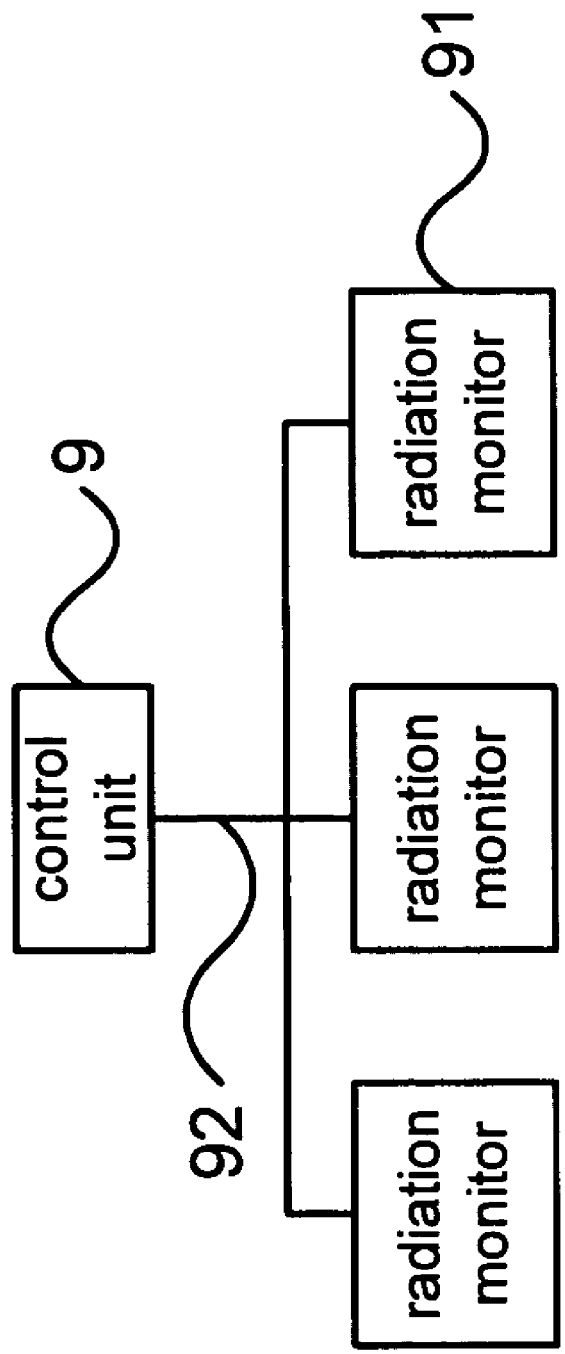
FIG. 5 is the state-of-use view of the prior art.

Please refer to FIG. 4, which is a view showing a state of use of a second preferred embodiment. As shown in the figure, a monitoring mechanism 1 of the preferred embodiment further comprises a context menu 8 comprising an alarm set menu 81, a real-time data menu 82 and a menu of a plurality of historical data 83, where the menu of the plurality of historical data 83 comprises a one-minute menu 831, a ten-minute menu 832, a one-hour menu 833 and a one-day menu 834. The one-minute menu 831 is to query data per minutes for past ten minutes; the ten-minute menu 832 is to query data per ten minutes for a day selected; the one-hour menu 833 is to query data per hour for a day selected; and the one-day menu 834 is to query data per day for a month selected.

When the operator processes the radiation area switching menu 3, an alarm setting of a specified radiation area 7 is established through the alarm set menu 81 with a monitoring device 14 of the radiation area 7 (i.e. a specified floor) and real-time data and historical data are queried through the real-time data menu 82 and the historical data menu 83.

To sum up, the present invention is a radwaste warehouse area monitoring system, where a radiation dosage of a radiation area in a radwaste storage area is monitored remotely for safe operation and multi-location monitoring.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A radwaste warehouse area monitoring system, comprising:
    a monitoring mechanism, said monitoring mechanism comprising a control unit, a display unit, a database unit and a plurality of monitoring device, said monitoring devices being located in a plurality of radiation areas separately;
    an alarm unit, said alarm unit being connected with said monitoring mechanism to send an alarm to said monitoring mechanism when a measured radiation value of a radiation area is greater than a default monitoring value;
    a radiation area switching menu, said radiation area switching menu being connected with said monitoring mechanism to switch to a monitored radiation area by said monitoring mechanism;
    a historical data unit, said historical data unit being connected with said monitoring mechanism to query historical data of a radiation area by said monitoring mechanism;
    a system maintenance unit, said system maintenance unit being connected with said monitoring mechanism to process a system maintenance by said monitoring mechanism; and
    a monitor information unit, said monitor information unit being connected with said monitoring mechanism to query information of said monitoring device in said radiation area.

2. The monitoring system according to claim 1, wherein said database unit stores and transfers monitored data of said radiation area.

3. The monitoring system according to claim 1, wherein said alarm unit periodically and automatically processes an alarm check;
    wherein alarm data is displayed when an alarm matter occurs, together with a flush light and a voice; and
    wherein said alarm data is stored in said database unit.

4. The monitoring system according to claim 1, wherein said historical data unit comprises a menu of a one-minute menu to query data per minute for past ten minutes; a ten-minute menu to query data per ten minutes for a chosen day; a one-hour menu to query data per hour for a chosen day; and a one-day menu to query data per day for a chosen month.

5. The monitoring system according to claim 1, wherein said system maintenance unit comprises a password set dialogue, an alarm set dialogue, an event query dialogue, an alarm query dialogue and a system information dialogue.

6. The monitoring system according to claim 1, wherein said monitor information unit queries, deletes and updates data of said monitoring device of said radiation area; and
    wherein said data of said monitoring device comprises a series number, a location, a device type, a radiation dosage unit, transfer parameters and alarming positions; and wherein said radiation dosage unit is selected from a group consisting of microcuries per cubic centimeter (uCi/cc), Bg/m³, and uSv/hr
wherein said transfer parameters comprises a regulation parameter, a background value and a sensitivity parameter.

7. The monitoring system according to claim 1,
wherein said monitoring mechanism further comprises a context menu; and
wherein said context menu comprises an alarm set menu, a real-time data menu and a menu of a plurality of historical data.

8. The monitoring system according to claim 7, wherein said menu of a plurality of historical data comprises a menu of a one-minute menu to query data per minute for past ten minutes; a ten-minute menu to query data per ten minutes for a chosen day; a one-hour menu to query data per hour for a chosen day; and a one-day menu to query data per day for a chosen month.

\* \* \* \* \*